United States Patent Office 3,011,941
Patented Dec. 5, 1961

3,011,941
ETHER DERIVATIVES OF SAFROLE AND ISOSAFROLE AND THEIR USE AS SYNERGISTS WITH PYRETHRINS IN INSECTICIDAL COMPOSITIONS
Joseph J. McGrath and John P. Pellegrini, Jr., Pittsburgh, Pa., assignors to Gulf Research & Development Company, Pittsburgh, Pa., a corporation of Delaware
No Drawing. Filed Dec. 27, 1957, Ser. No. 705,502
10 Claims. (Cl. 167—33)

This invention relates to the production of new chemical compounds and to insecticidal compositions containing such compounds with pyrethrins.

Pyrethrum extracts or pyrethrins have been used successfully in insecticidal compositions to combat a great variety of insects. Likewise, it is quite common in the art to utilize synergists with pyrethrins to increase their effectiveness and to achieve greater economy in the preparation of insecticidal compositions.

The present invention provides new chemical compounds possessing synergistic properties which advantageously suit them for use with pyrethrins in insecticidal compositions.

The new compounds which we have found to be remarkably effective synergists for pyrethrins are ether derivatives of safrole and isosafrole in which the aliphatic constituent thereof contains a glycol or polyglycol ether radical together with either a halogen or hydroxyl substituent.

The safroles are methylenedioxy benzene derivatives with aliphatic hydrocarbon substitutents in the benzene ring. In the case of safrole itself the substituent is the allyl group, safrole being 3,4-methylenedioxy allyl benzene. In the case of isosafrole the substituent is the propenyl group, isosafrole being 3,4-methylenedioxy propenyl benzene.

The new compounds of this invention have the following general formula:

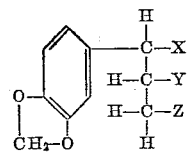

wherein, one member of the group X, Y and Z is an OR group in which R is an aliphatic hydrocarbon radical containing between 3 and 13 carbon atoms and which is interrupted by at least one ethereal oxygen atom, an adjacent member of said group is selected from among the group consisting of halogen and hydroxyl and the last member of said group is hydrogen.

The synthesis of the new compounds is accomplished in general by reacting with safrole or isosafrole a halogen or a hypohalous acid and thereafter reacting the halogen derivative of safrole or isosafrole with the sodium salt of a glycol or polyglycol ether having the general formula:

$$Na—[O—A—]_n—OR'$$

in which A is a saturated bivalent aliphatic hydrocarbon radical having from 2 to 3 carbon atoms and $n$ is an integer from 1 to 3, and R' is an alkyl radical.

Safrole on reaction with a hypohalous acid gives a hydroxy substituted halogenated derivative which upon further reaction with the sodium salt of a glycol or polyglycol gives as a final product a derivative of safrole in which the aliphatic hydrocarbon constituent contains a hydroxyl substituent and an ether substituent. These reactions are illustrated by Equation I.

(Equation I)

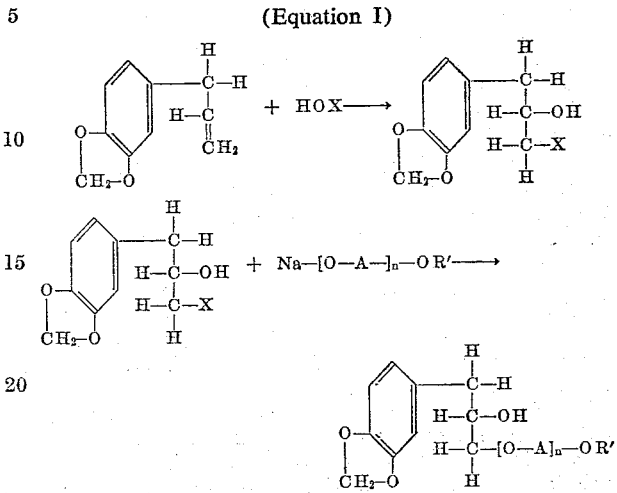

In the above equation X is a halogen such as chlorine or bromine and A, $n$, R' have the meaning above indicated.

Instead of a hypohalous acid, a halogen can be employed for reaction with the safrole to produce a halogenated derivative which upon further reaction with the sodium salt of a glycol or polyglycol gives as a final product a derivative of safrole in which the aliphatic hydrocarbon constituent contains a halogen substituent and an ether substituent. These reactions are illustrated by Equation II.

(Equation II)

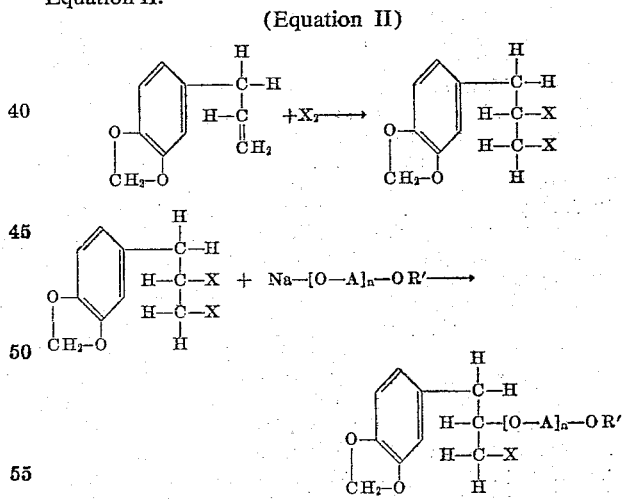

In the above equation X, A, $n$, and R' have the meaning indicated previously.

Isosafrole can be utilized in place of safrole in the above reactions to obtain derivatives having the same substituents as shown above. In the case of isosafrole, substitution in the aliphatic constituent occurs on the 1,2 carbon atoms rather than on the 2,3 carbon atoms as in the case of safrole.

Suitable glycols and polyglycols which are used in the form of their sodium salts in making the new compounds include ethers of monoethylene glycols and polyethylene glycols as well as higher alkylene monoglycols and polyglycols and include the monomethyl ether of monoethylene glycol, the monoethyl ether of monoethylene glycol, the mono-n-butyl ether of monoethylene glycol, the 2-ethylbutyl ether of monoethylene glycol, the monomethyl ether of diethylene glycol, the monoethyl ether of diethylene glycol, the mono-n-butyl ether of ethylene glycol, the mono-2-ethylbutyl ether of diethylene glycol, the monoethyl ether of triethylene glycol, the monomethyl ether of propylene glycol, the monobutyl ether of dipropylene glycol, and the like.

The new ether derivatives of safrole and isosafrole are in general, effective synergists for pyrethrins enabling the formulation of effective insecticides comprising pyrethrins in small amounts in admixture with the new ether derivatives.

The new compounds were tested for insecticidal activity utilizing the Barnhart Tower Test or as it is commonly known, the Mist Tower Method for testing insecticides. The Barnhart spray tower utilized in the test is adapted for the controlled application of a settling mist and consists of a vertical spray tower of two concentric celluloid cylinders. The dosage of spray is delivered by means of a DeVilbiss artist's air brush as a fine mist. A slide permits the larger droplets to settle for a desired time to form a standard mist. The slide is then moved and the flies which are confined in paper dishes covered with wire screen, are exposed for a time to the standard mist. Sugar water solution is applied to the treated cage and the percent dead is determined 24 hours after treatment. This apparatus is described in detail in the 1941 issue of Soap and Sanitary Chemicals, vol. #7, pp. 105–115.

The following examples illustrate the production and synergistic effect of specific compounds described by the above general formula.

*Example 1*

A solution of hypochlorous acid is prepared as follows: A solution of 12.5 grams of mercuric chloride in 250 ml. water is placed in a 3-liter flask and 400 grams cracked ice is added. A cold solution of 95 grams sodium hydroxide in 250 cc. water is then added to the flask and a rapid stream of chloride gas is passed into the mixture. The reaction mixture is maintained at a temperature below 5° C. The addition of chlorine is continued util the yellow precipitate of mercuric oxide disappears. Then 800 ml. of cold nitric acid (1.5 N) is added slowly with stirring to produce a solution, approximately 3.5 to 4 percent of which is hypochlorous acid. Fifty milliliters of the prepared hypochlorous acid solution is added to 32.4 grams (0.2 mol) of isosafrole in a 3-liter round bottom flask fitted with an efficient stirrer and the mixture is held at approximately 20° C. with stirring. After stirring for several minutes, the mixture is tested for excess hypochlorous acid by means of dilute hydrochloric acid and potassium iodide solution. Repeated 50 ml. portions of hypochlorous acid are added until a total of 300 ml. has been added. This solution then gives a positive test for hypochlorous acid. Approximately 100 ml. hypochlorous acid solution is added in excess and the mixture stirred about 10 minutes. Approximately 400 ml. of ethyl ether is then added and the mixture washed 7 to 8 times with water until the wash extracts are no longer acidic. The ether extract is then dried over anhydrous sodium sulfate, filtered, and placed under water-aspirator vacuum to remove the ether solvent. Thirty-six grams (84 percent yield) of isosafrole chlorohydrin, a yellow oil is obtained.

For reaction with the isosafrole chlorohydrin the sodium salt of diethylene glycol monobutyl ether (hereinafter to be referred to by its trade name butyl "Carbitol") is employed. The sodium salt of butyl "Carbitol" is prepared by placing 162 grams (1.0 mole) of butyl "Carbitol" dissolved in 90 ml. of benzene in a round bottom flask fitted with a Dean-Stark trap and refluxing condenser. Twenty-two grams (0.55 mole) of sodium hydroxide pellets are then added to the flask and the reaction mixture is refluxed overnight (approximately 16 hours) until no more water is collected. The reaction mixture is then cooled and the sodium salt of butyl "Carbitol" is ready for use.

Fourteen and two-tenths grams (0.05 mole) of the sodium butyl "Carbitol" is added to 21.4 grams (0.10 mole) of isosafrole chlorohydrin. An immediate heat of reaction is observed and the mixture is refluxed overnight. The following day the mixture is cooled, filtered with the aid of 10 grams Celite to remove the sodium chloride which forms during the reaction and dried over anhydrous sodium sulfate. The amount of sodium chloride obtained is approximately 2.9 grams which indicates a yield of approximately 50 percent. After filtering the dried mixture and removing solvent by a water-aspirator vacuum, 15.8 grams of a dark oil is obtained. The principal constituent of this oil is a compound having the formula:

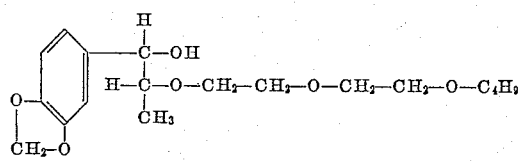

This new compound is designated Compound I and has been tested as a synergist for pyrethrins employing the insecticide test described previously. Utilizing five replicates of approximately 120 flies each, the following average results were obtained:

| Spray No. | Mg./100 cc. naphtha | Percent Dead 24 Hours |
|---|---|---|
| I | 50 mg. pyrethrins | 53.6 |
| II | 1,000 mg. Compound I | 8.2 |
| III | 50 mg. pyrethrin and 1,000 mg. Compound I | 100 |

*Example II*

Twenty-four grams (0.15 mole) of safrole in 525 ml. of water is emulsified with stirring in a round-bottom flask at a temperature of 85–90° C. A solution containing 22 grams of potassium bromide in 300 ml. water and 27 grams bromine is added to the safrole solution dropwise with stirring for one-half hour. The reaction mixture is maintained at this temperature for one-half hour with continued stirring. After cooling, ether is added to dissolve the oil formed; the ethereal solution is washed twice with water, dried over anhydrous sodium sulfate, filtered, and placed under water-aspirator vacuum to remove the solvent. The resulting oil, reddish-brown in color, is safrole bromohydrin. Twenty-seven grams (70 percent yield) of freshly prepared safrole bromohydrin is added to a benzene solution containing 31.3 grams (0.11 mole) sodium butyl "Carbitol" prepared as in Example I. This addition causes an immediate evolution of heat. The mixture is refluxed for one hour and cooled. The mixture is then washed twice with water, and dried over anhydrous sodium sulfate and solvent is removed by means of a water-aspirator vacuum. A dark colored oil is obtained, the principal constituent of which is a compound having the formula:

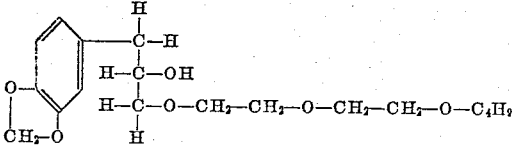

This new compound is designated Compound II and has been tested as a synergist for pyrethrins employing the insecticide tests described previously. Utilizing five replicates of approximately 120 flies each, the following results were obtained:

| Spray No. | Mg./100 cc. naphtha | Percent Dead 24 Hours |
|---|---|---|
| I | 50 mg. pyrethrin | 53.6 |
| II | 1,000 mg. Compound II | 4.1 |
| III | 50 mg. pyrethrin and 1,000 mg. Compound II | 100 |

*Example III*

Eighty-one and one-tenth grams (0.5 mole) of safrole dissolved in 175 ml. anhydrous ether is placed in a 3-liter, 3-necked flask with a dropping funnel, water condenser and stirrer. Seventy-nine and nine-tenths grams (0.5 mole) of bromine is then added dropwise. The mixture is maintained at a temperature of approximately 5–10° C. during the addition of the bromine which requires approximately one-half hour. The mixture is stirred for an additional hour. To this solution is then added dropwise with stirring, 142.1 grams (0.5 mole) sodium butyl "Carbitol" dissolved in benzene. The sodium butyl "Carbitol" is prepared as in Example I. After the addition of the sodium butyl "Carbitol" the mixture is stirred 1.5 hours over a boiling water bath, cooled, filtered, dried over anhydrous sodium sulfate, filtered again and placed under a water aspirator vacuum to remove solvent. A dark red oil is obtained, the principal constituent of which is a compound having the formula:

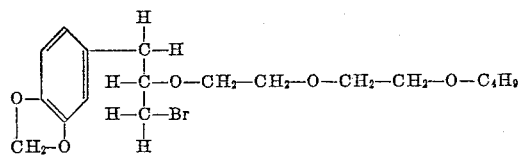

This new compound is designated Compound III and has been tested as a synergist for pyrethrins employing the insecticide tests described previously. Utilizing five replicates of approximately 120 flies each, the following results were obtained:

| Spray No. | Mg./100 cc. naphtha | Percent Dead 24 Hours |
|---|---|---|
| I | 50 mg. pyrethrins | 35.9 |
| II | 1,000 mg. Compound III | 4 |
| III | 50 mg. pyrethrins and 1,000 mg. Compound III | 100 |

*Example IV*

To 32.4 grams (0.2 mole) isosafrole dissolved in 100 ml. carbon tetrachloride is added dropwise with stirring, 35.2 grams (0.22 mole) of bromine. The temperature of the reaction mixture is maintained at 0–10° C. during the addition of the bromine which requires approximately three hours. The reaction mixture is stored overnight at a temperature of about 10° C. Carbon tetrachloride is removed by distillation under reduced pressure. A solid melting at 47° C. which is isosafrole dibromide is obtained together with an oil which is discarded. Six and eighty-four-hundredths grams (0.02 mole) of solid isosafrole dibromide is reacted with 5.68 grams (0.02 mole) of sodium butyl "Carbitol" dissolved in benzene. The reaction mixture is refluxed 4 hours and allowed to remain overnight at room temperature. After filtration and evaporation under reduced pressure, 7 grams of a red oil is obtained. The principal constituent of the oil is a compound having the formula:

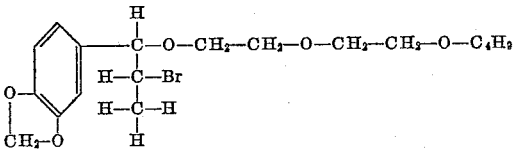

This compound is designated Compound IV and was tested as a synergist employing the insecticide tests described previously. Utilizing five replicates of approximately 120 flies each, the following results were obtained:

| Spray No. | Mg./100 cc. naphtha | Percent Dead 24 Hours |
|---|---|---|
| I | 50 mg. pyrethrins | 54.4 |
| II | 1,000 mg. Compound IV | 1.9 |
| III | 50 mg. pyrethrins and 1,000 mg. Compound IV | 91.0 |

From the results shown in Examples I, II, III and IV, synergism is clearly indicated for the new compounds. As seen, the killing effect obtained when these new compounds are employed jointly with pyrethrins in insecticidal compositions is much greater than the sum total of the individual effects.

The new synergistic compounds of the invention are oily liquids which are miscible in various solvents commonly used in insecticidal compositions as carriers for pyrethrin toxicants. The new compounds are ideally suited to be employed with pyrethrins in petroleum hydrocarbon solvents such as naphtha as shown in the above examples.

The compounds disclosed in this invention as synergists are employed in insecticidal compositions in amounts sufficient to materially increase the killing power of pyrethrin toxicants. Generally, synergistic action is obtained when they are employed in amounts ranging from about 0.02 to 5 percent by weight of the total composition.

Resort may be had to such modifications and variations which fall within the spirit of the invention and the scope of the appended claims.

We claim:
1. The compounds of the generic formula:

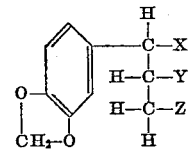

wherein, one member of the group X, Y, Z is an OR group in which R is an aliphatic hydrocarbon radical containing between 3 and 13 carbon atoms and which is interrupted by at least one ethereal oxygen atom, an adjacent member of said group is selected from among the group consisting of halogen and hydroxyl and the last member of said group is hydrogen.

2. A compound having the structural formula:

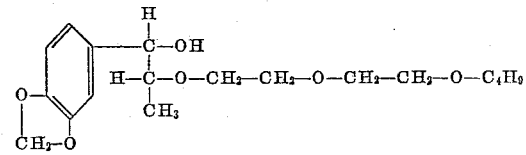

3. A compound having the structural formula:

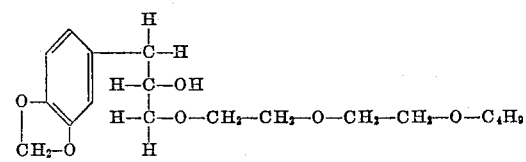

4. A compound having the structural formula:

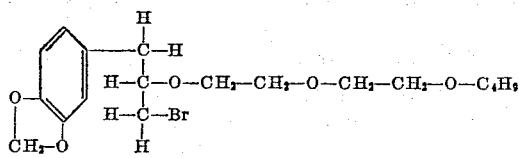

5. A compound having the structural formula:

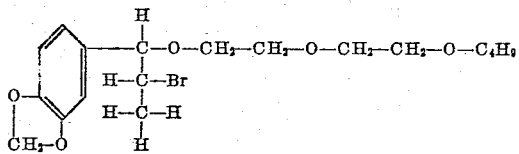

6. An insecticide composition containing pyrethrins and a compound of the generic formula:

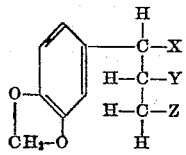

wherein one member of the group X, Y, Z is an OR group in which R is an aliphatic hydrocarbon radical containing between 3 and 13 carbon atoms and which is interrupted by a least one ethereal oxygen atom, an adjacent member of said group is selected from among the group consisting of halogen and hydroxyl and the last member of said group is hydrogen.

7. An insecticide composition containing pyrethrins and the compound of claim 2.

8. An insecticide composition containing pyrethrins and the compound of claim 3.

9. An insecticide composition containing pyrethrins and the compound of claim 4.

10. An insecticide composition containing pyrethrins and the compound of claim 5.

References Cited in the file of this patent

UNITED STATES PATENTS

| | | |
|---|---|---|
| 2,456,316 | Prill | Dec. 14, 1948 |
| 2,485,681 | Wachs | Oct. 25, 1949 |
| 2,521,366 | Hedenburg | Sept. 5, 1950 |
| 2,906,663 | Chodroff et al. | Sept. 29, 1959 |

FOREIGN PATENTS

| | | |
|---|---|---|
| 48,334 | Austria | June 10, 1911 |
| 143,891 | Sweden | Nov. 5, 1953 |

UNITED STATES PATENT OFFICE

CERTIFICATE OF CORRECTION

Patent No. 3,011,941  December 5, 1961

Joseph J. McGrath et al.

It is hereby certified that error appears in the above numbered patent requiring correction and that the said Letters Patent should read as corrected below.

Column 3, line 11, for "monomethyl" read -- monoethyl --; line 46, for "chloride" read -- chlorine --; line 49, for "util" read -- until --.

Signed and sealed this 10th day of April 1962.

(SEAL)
Attest:

ERNEST W. SWIDER

Attesting Officer

DAVID L. LADD

Commissioner of Patents